(12) United States Patent
Makino et al.

(10) Patent No.: US 7,317,561 B2
(45) Date of Patent: Jan. 8, 2008

(54) IMAGE READING APPARATUS, AND IMAGE FORMING APPARATUS

(75) Inventors: Yuichi Makino, Ibaraki-ken (JP); Yuji Yamanaka, Ibaraki-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 874 days.

(21) Appl. No.: 10/781,886

(22) Filed: Feb. 20, 2004

(65) Prior Publication Data
US 2004/0165227 A1    Aug. 26, 2004

(30) Foreign Application Priority Data
Feb. 24, 2003    (JP)    ............................. 2003-045956

(51) Int. Cl.
  *H04N 1/04* (2006.01)
(52) U.S. Cl. ...................... 358/496; 358/486; 358/498; 358/406; 358/461; 358/474
(58) Field of Classification Search ................ 358/496, 358/498, 486, 461, 463, 406, 504, 474, 505; 382/274, 318, 319; 250/234–236; 399/367, 399/9, 16, 17
See application file for complete search history.

(56) References Cited

U.S. PATENT DOCUMENTS

| | | | |
|---|---|---|---|
| 5,930,008 A * | 7/1999 | Nabeshima et al. | 358/496 |
| 6,563,938 B1 * | 5/2003 | Harada | 382/108 |
| 6,600,579 B1 * | 7/2003 | Kumagai et al. | 358/474 |
| 7,196,827 B2 * | 3/2007 | Yamanaka | 358/496 |
| 7,212,320 B2 * | 5/2007 | Imoto | 358/497 |
| 2003/0043410 A1 | 3/2003 | Fukawa et al. | 356/2.1 |
| 2004/0125412 A1 * | 7/2004 | Sugeta | 358/3.26 |
| 2004/0223192 A1 * | 11/2004 | Hiromatsu et al. | 358/474 |
| 2005/0128536 A1 * | 6/2005 | Yamanaka et al. | 358/488 |
| 2007/0009296 A1 * | 1/2007 | Shoji | 399/367 |

FOREIGN PATENT DOCUMENTS

| | | | |
|---|---|---|---|
| JP | 9093392 | | 4/1997 |
| JP | 2000295430 A | * | 10/2000 |
| JP | 2002232643 A | * | 8/2002 |

OTHER PUBLICATIONS

U.S. Appl. No. 10/792,735, filed Mar. 5, 2004, Makino et al.

* cited by examiner

*Primary Examiner*—Cheukfan Lee
(74) *Attorney, Agent, or Firm*—Fitzpatrick, Cella, Harper & Scinto

(57) ABSTRACT

The present invention relates to an image reading apparatus comprising a conveying means for conveying a sheet to a reading position; a platen glass guiding the sheet conveyed at the reading position; a reading apparatus for reading through the platen glass an image on the sheet conveyed at the reading position; a sheet guide member disposed on a side opposite to the reading device with respect to the platen glass for forming a small gap with the platen glass; and a driving means for moving the reading device. The drive device can move the reading device to a main reading position for reading operation at a position at which the sheet conveyed to the reading position is in contact with the platen glass and to at least one sub reading position for reading operation at a position at which the sheet conveyed to the reading position is not in contact with the platen glass.

9 Claims, 11 Drawing Sheets

IMAGE READING APPARATUS, AND IMAGE FORMING APPARATUS

BACKGROUND OF THE INVENTION

1. Field of the Invention

This invention relates to an image reading apparatus such as a scanner, and to an image forming apparatus such as a photocopier, a printer, and a facsimile machine and, more particularly, to an image reading apparatus readable of images on a sheet conveyed.

2. Description of Related Art

In image reading apparatuses provided at, e.g., digital photocopiers, printers, facsimile machines, an ADF (automatic document feeder), serving as an sheet automatic conveying device, has been provided as to be openable to automatically feed original documents to an image reading apparatus.

As a reading method done at the image reading apparatus having the ADF, so-called "flowingly reading" has been known. Flowingly reading is a method for reading images by scanning light emitted from a lamp unit to the original documents conveyed at a prescribed speed from the ADF after moving the reading apparatus provided below the ADF at the setting position with a motor and stopping the device, and then by detecting the reflecting light with the reading apparatus.

A structure around the reading position of the image reading apparatus using such a flowingly reading method is shown in FIG. 10 and FIG. 11. In the structure shown in FIG. 10, a pair of conveyance rollers 402, 403 is provided on an upstream side and a downstream side of the reading position α, and a guide member 405 is arranged over the reading position α for forming a prescribed gap with a platen glass 404. The reading apparatus 401 is moved to the reading position α, and images are read in suppressing rate deviations during the original document conveying operation upon conveying the original document P at a constant rate over the reading position α as restricting the original document P with the gap. The reading position a is provided at a position on an upstream side of the position that the original document P contacts to the platen glass 404, and the original document P is read as slightly floated from the platen glass 404.

As shown in FIG. 11, there is also a structure in which a platen roller 406 rotatable by a drive apparatus, not shown, is provided in lieu of the guide member 405 to convey the original document as pushed to the platen glass 404 with a smaller gap than that of the guide member 405. The platen roller 406 is used as a structure preventing the original document P from floating with respect to a reading apparatus having a shallow reading depth such as a CIS (contact image sensor). The reading position β is, at that time, provided at a position that the original document P near the platen roller 406 and the platen glass 406 are in contact with each other.

As a prior art regarding the reading position in image reading apparatuses for "flowingly reading", Japanese Unexamined Patent Publication No. Heisei 9-93,392 has been known. In Publication No. Heisei 9-93,392, a structure of a digital type image reading apparatus capable of feeding original documents with a stable optical system, is described in which the original document reading position using the charge-coupled device (CCD) is placed at a position other than the narrowest portion formed with the backup roller and the original document table. With this structure, original document is read at a position avoiding regions at which dusts on the original document are easily attached or stagnated, so that black stripes due to dusts are prevented from occurring, and so that good image reading is realized.

As described above, image reading can be done even at the reading position α at which the original document does not contact with the platen glass 404 as shown in FIG. 10 as well as even at the position β as shown in FIG. 11.

Dusts or floating dusts such as toner powders, paper powders, and rubber debris generated during original document conveyance operation, however, may be scattered and deposited on the platen glass 404 at the reading position α in FIG. 10 since the reading operation is done at a position at which the original document P does not contact with the platen glass 404. During the flowingly reading operation, these deposited floating dusts may be read as an image in a stripe shape because the reading apparatus 401 does not move.

In a meanwhile, the reading position β in FIG. 11 allows reading with high quality and is advantageous, because it is easy to focus on the targeted object since the distance from the reading apparatus 401 is constant and because the apparatus is rarely affected from impacts during the original document conveyance operation. Dusts or attached dusts such as inks, correction liquids, and pastes attached to the original document P may be easily attached to the platen glass 404 upon contacting to the platen glass 404, and therefore, the dusts may be read as an image in a stripe shape when the attached dusts are reattached to the reading position of the platen glass 404.

Thus, with any structures of conventional image reading apparatuses, it is difficult to prevent images in stripe shapes from occurring due to attachment of either floating dusts or attached dusts.

SUMMARY OF THE INVENTION

It is an object to provide, in an image reading apparatus capable of reading images while conveying original documents or namely, capable of flowingly reading images, an image reading apparatus capable of preventing stripe images from occurring.

To solve the above problems, a representative structure of the image reading apparatus according to the invention is comprising: a conveying device for conveying a sheet to a reading position; a platen glass guiding the sheet conveyed at the reading position; a reading apparatus for reading through the platen glass an image on the sheet conveyed at the reading position; a sheet guide member disposed on a side opposite to the reading device with respect to the platen glass for forming a small gap with the platen glass; and a driving device for moving the reading device, wherein the drive device can move the reading device to a main reading position for reading operation at a position at which the sheet conveyed to the reading position is in contact with the platen glass and to at least one sub reading position for reading operation at a position at which the sheet conveyed to the reading position is not in contact with the platen glass.

With the image reading apparatus according to the invention, the reading device is structured to perform the reading operation in switching its position between the main reading position at which the sheet is in contact with the platen glass and the sub reading position at which the sheet is not in contact with the platen glass, so that images are normally read with high image quality at the main reading position whereas images are read with image quality of substantially the same degree at the sub reading position when ink, correction liquid, or paste are attached on the platen glass thereby preventing images in stripe shapes from occurring.

DETAILED DESCRIPTION OF THE PREFERRED EMBODIMENTS

First Embodiment

Figure 1:
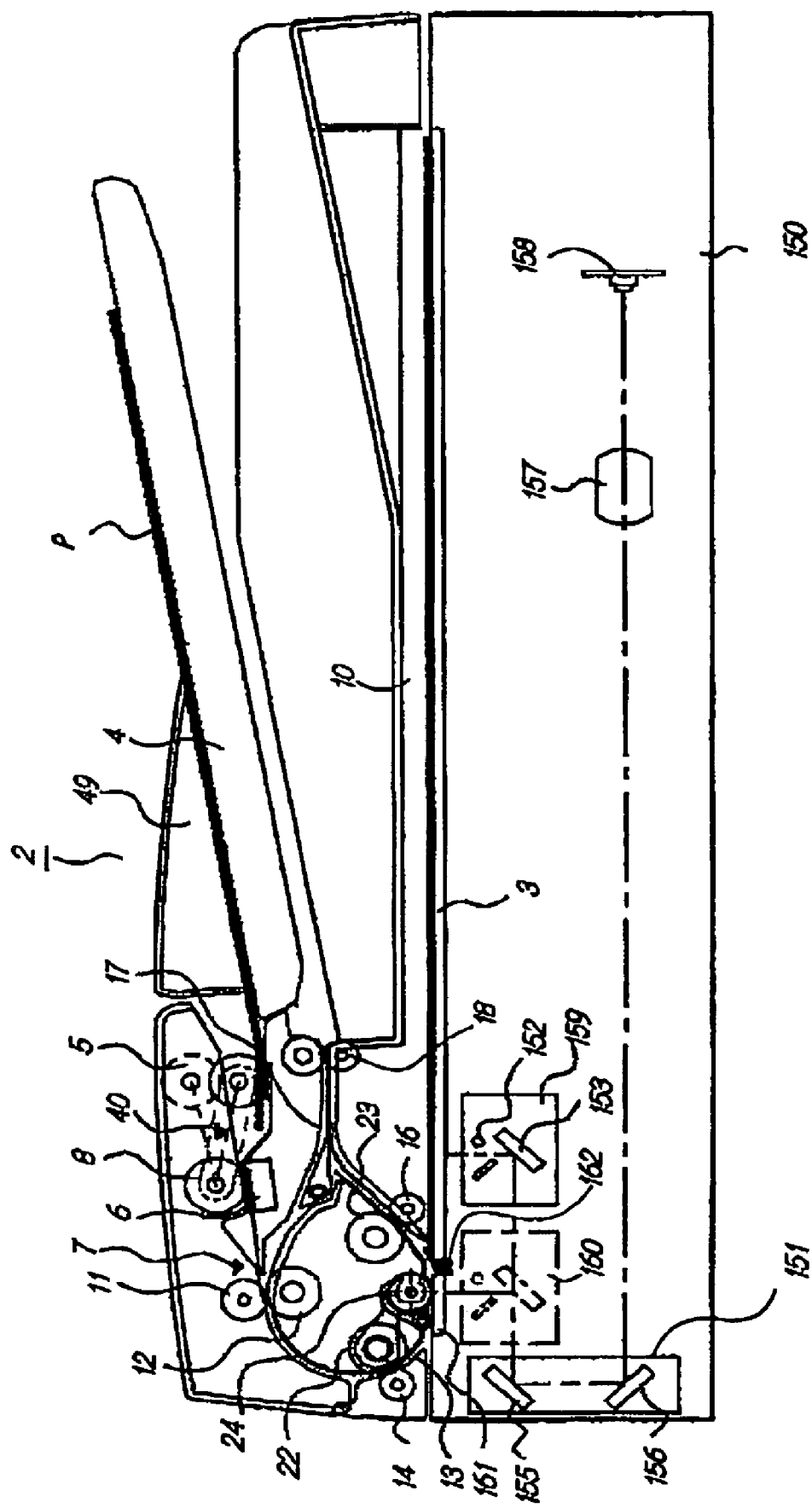
FIG. 1 is an entire structural diagram showing an image reading apparatus.
Figure 2:
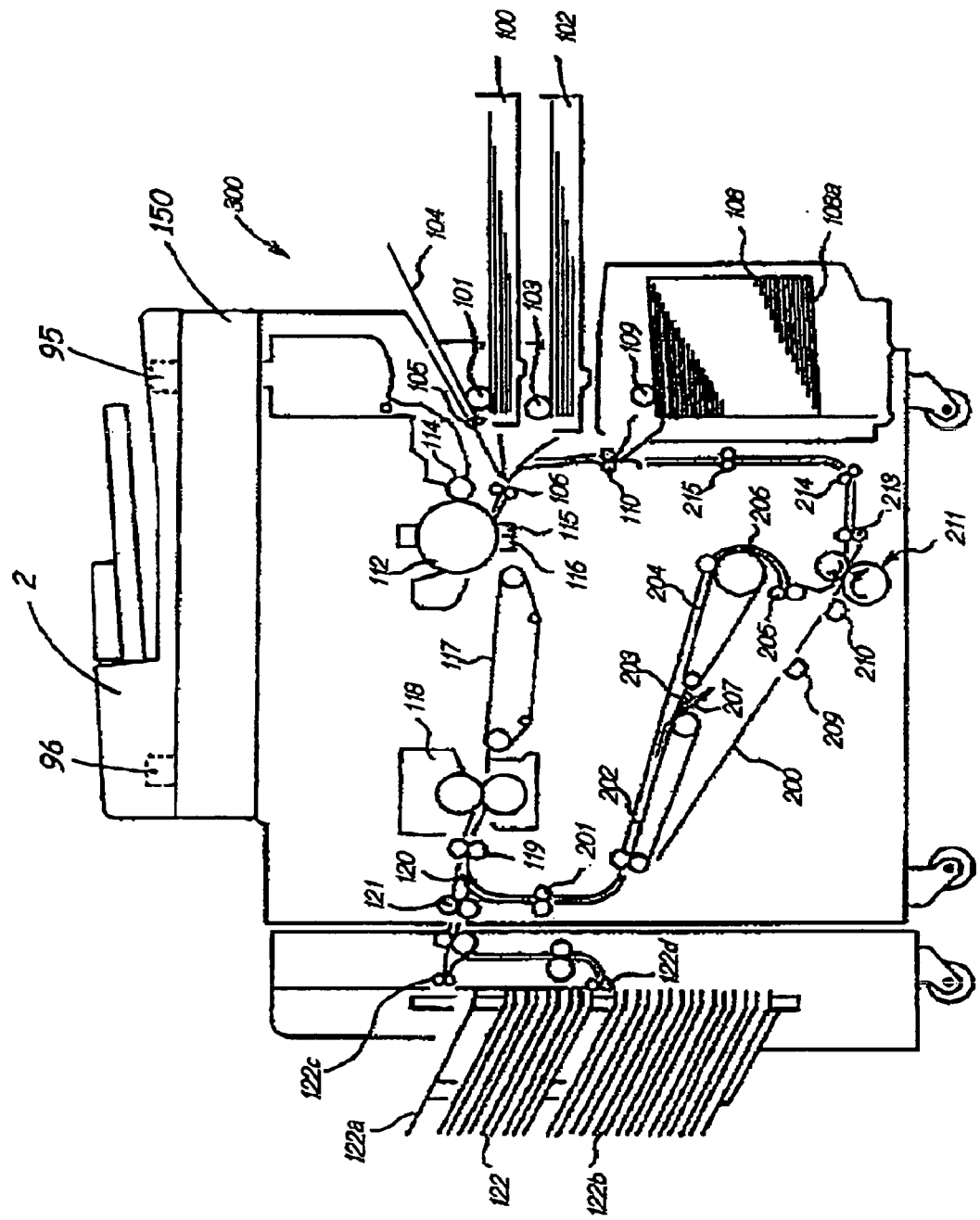
FIG. 2 is an entire structural diagram showing an image forming apparatus.
Figure 3:
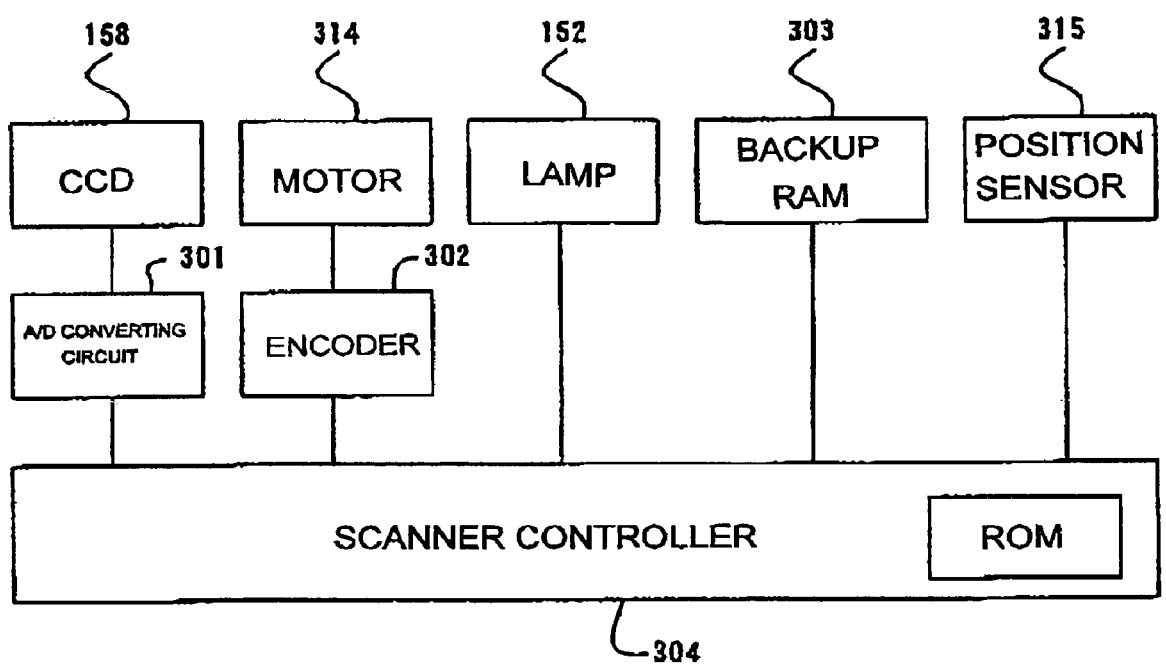
FIG. 3 is a block diagram illustrating the structure of the image reading apparatus.
Figure 4:
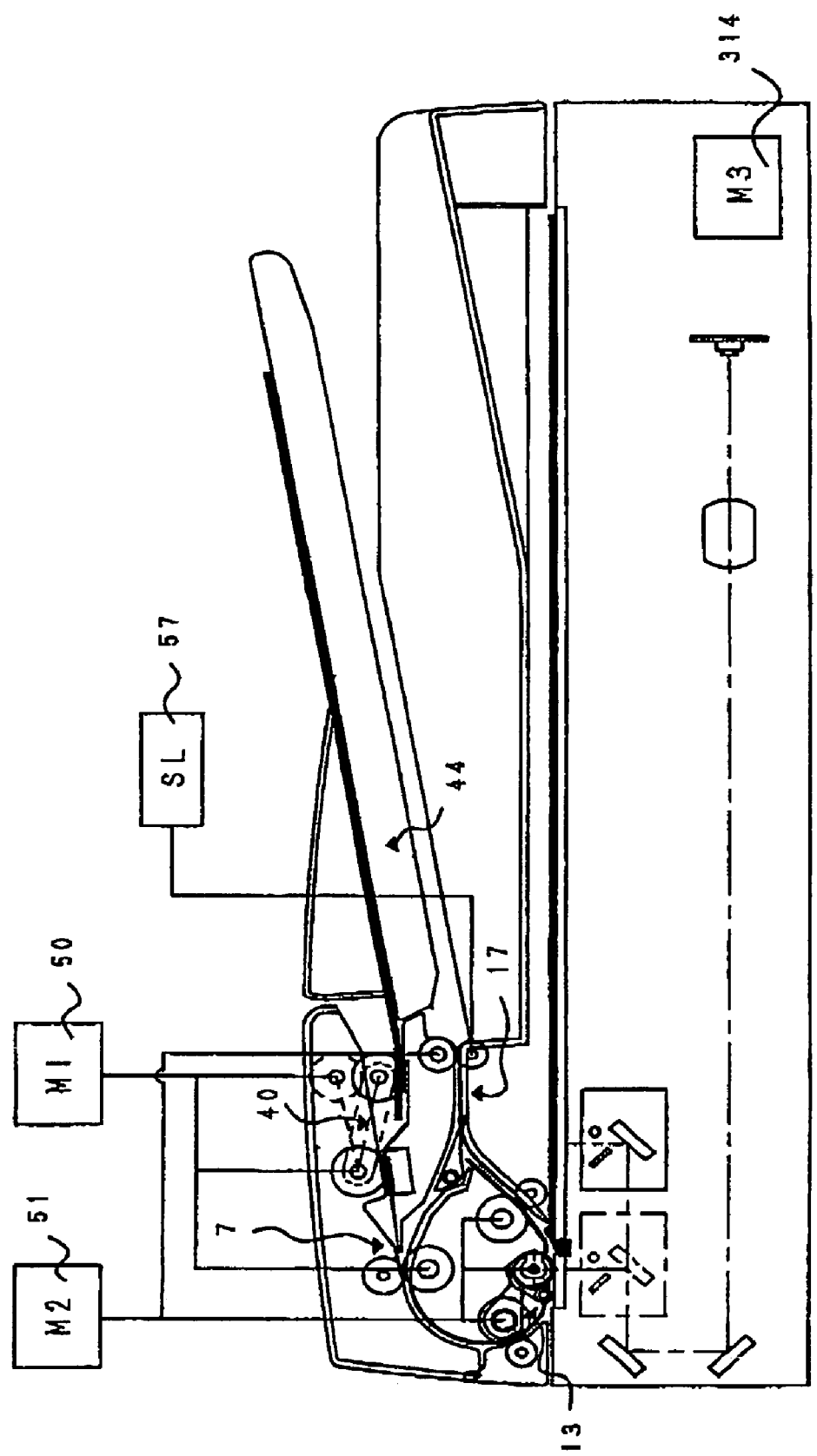
FIG. 4 is a diagram showing a drive system of the image reading apparatus.
Figure 5:
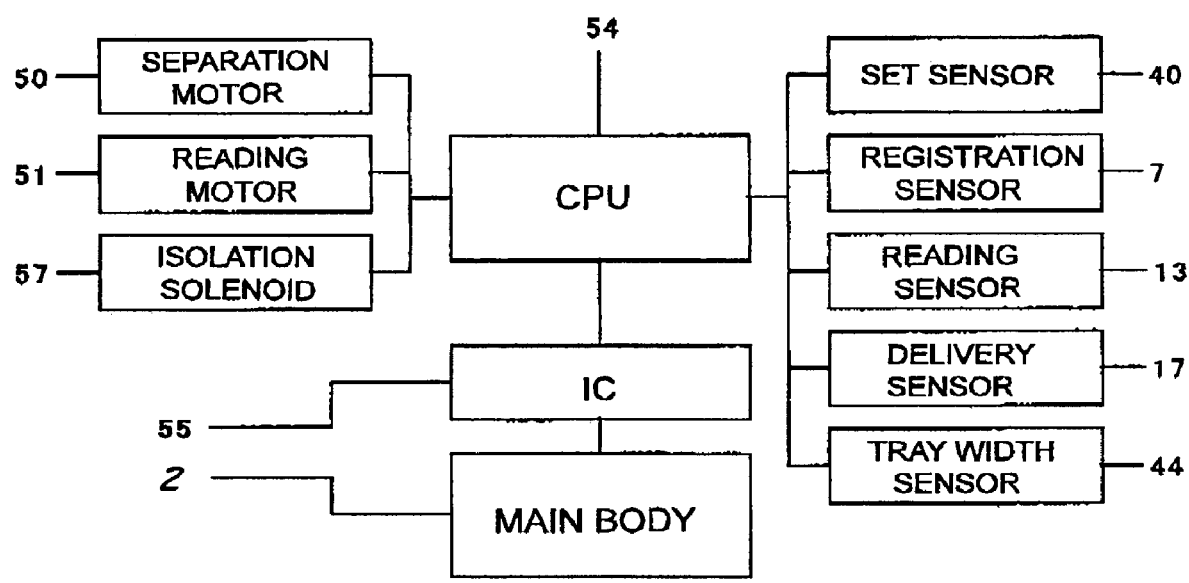
FIG. 5 is a control black diagram of the image reading apparatus.
Figure 6:
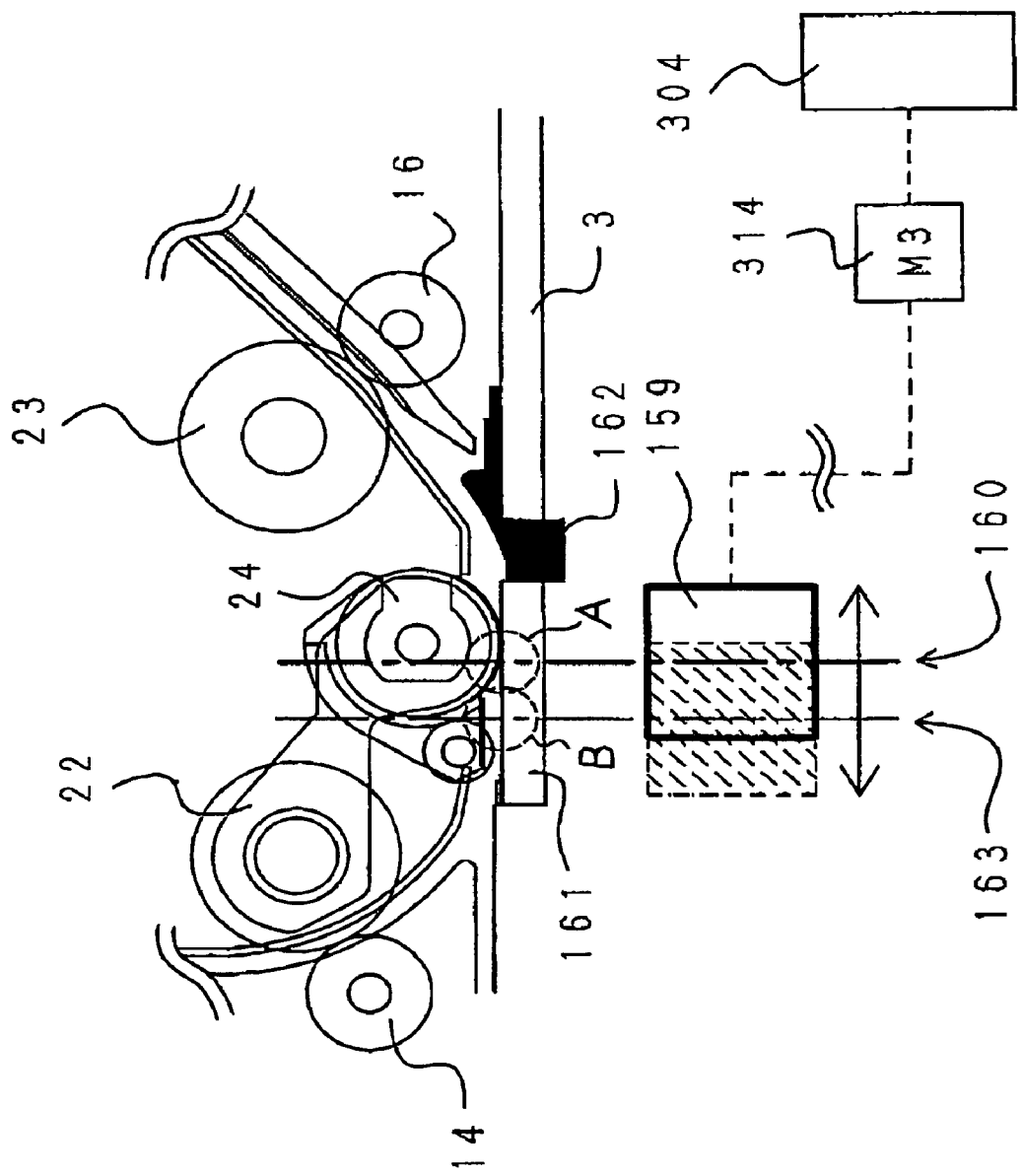
FIG. 6 is an enlarged diagram illustrating a reading section.
Figure 7:
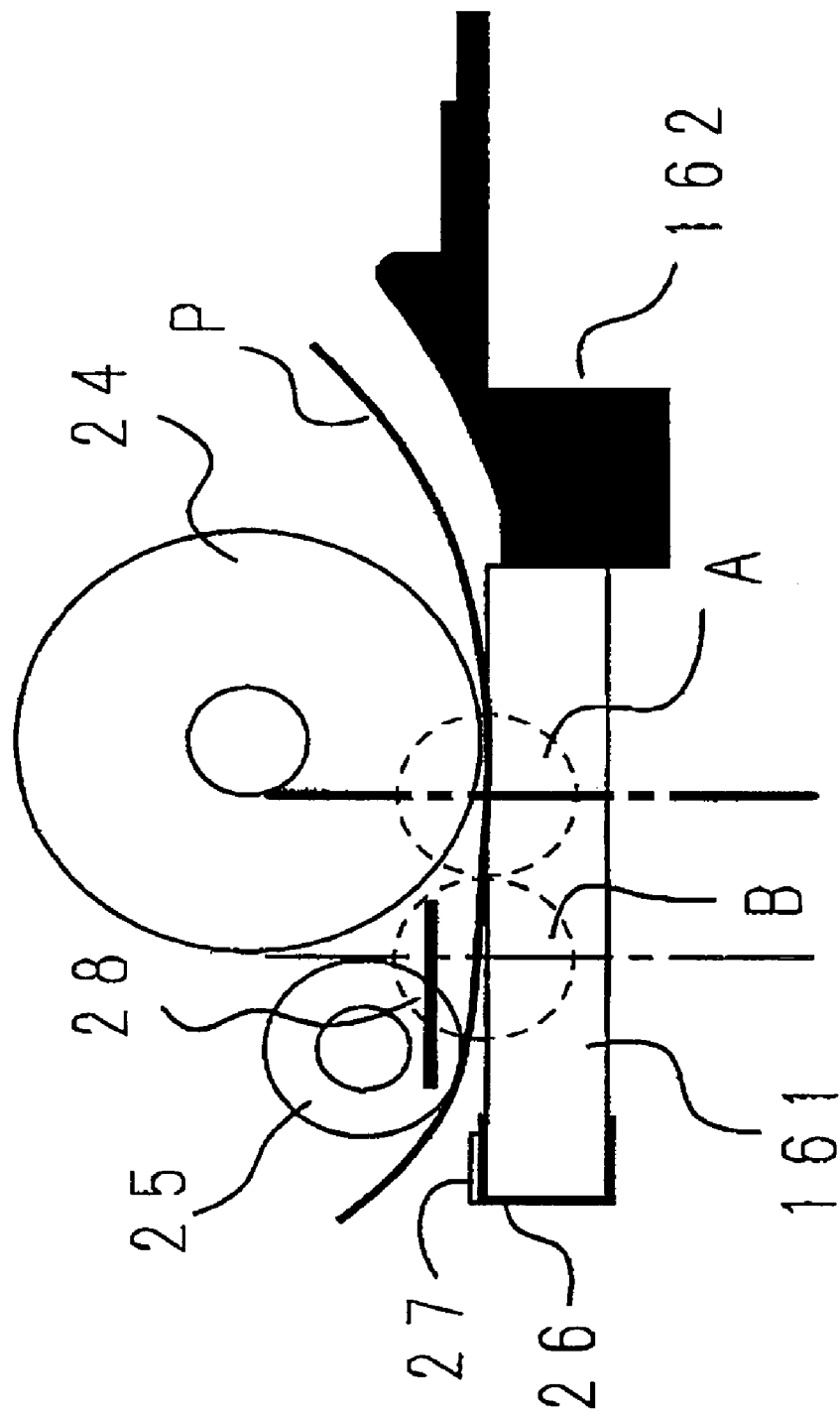
FIG. 7 is an enlarged diagram illustrating the reading section.

An image reading apparatus according to the first embodiment of the invention is described in using a photocopier serving as an image forming apparatus having the image reading apparatus. FIG. 1 is an entire structural diagram showing an image reading apparatus; FIG. 2 is an entire structural diagram showing an image forming apparatus; FIG. 3 is a block diagram illustrating the structure of the image reading apparatus; FIG. 4 is a diagram showing a drive system of the image reading apparatus; FIG. 5 is a control black diagram of the image reading apparatus; FIG. 6 and FIG. 7 are enlarged diagrams illustrating the reading section.

As shown in FIG. 2, the image forming apparatus according to the invention is constituted of a reading section 150, an ADF 2 serving as an automatic sheet conveying device, and a recording section 300. The image reading apparatus in this embodiment is constituted of the reading section 150 and the ADF 2, and the image forming apparatus includes those and additionally has the recording section 300. Now, details of the respective sections are described below.

As shown in FIG. 1, the reading section 150 includes a lamp 152 emitting light to an original document surface, and mirrors 153, 155, 156 leading to a lens 157 and a CCD 158 the reflecting light from the original document P faced to the light emitted from the lamp 152. The lamp 152 and the mirror 153 are attached to a first optical stage 159 whereas the mirrors 155, 156 are attached to a second optical stage 151. The optical stages 159, 151 are coupled via wires 154, not shown, to a motor 314 (see, FIG. 4) serving as a drive device for moving the reading device and controlled to move parallel to an original document table glass 3 according to rotational drive of the motor 314. The reflecting light from the original document is introduced to the lens 157 via the mirrors 153, 155, 156, and is converged on the CCD 158 by the lens 157. The CCD 158 outputs an image signal in an electrical form upon a light to electric conversion of the reflecting light, which reflects the original document information.

According to the above structure, the apparatus can read original document information in two modes: a flowingly reading mode in which the original document information is read as the original document is conveyed by the ADF 2 while the first optical stage 159 is stopped at a main reading position 160, and an original document table glass reading mode in which the original document information is read as the optical stages 159, 151 are moved in the sub-scanning direction where the original document is placed in a stationary manner on the original document table glass 3.

FIG. 3 is a block diagram showing a schematic structure of the reader's control system. The system includes the lamp 152 for emitting light to the surfaces of the original documents, the motor 314 for scanning the original document in moving the optical stages 159, 151 in the sub-scanning direction, the CCD 158 for optoelectric conversion of the reflecting light from the original document surface, an A/D converting circuit 301 for rendering an A/D conversion from the output signal of the CCD 158, an encoder 302 coupled to the motor 314, a position sensor 315 for positioning the lamp 315 emitting light to the original document and the optical stage 159 at the home position, a backup RAM 303 for setting the normal original document reading position during the flowingly reading mode, and a scanner controller 304.

The position sensor 315 is a sensor for detecting the home position of the first optical stage 159, and the optical stages 159, 151 are moved by normal or reverse rotation of the motor 314 with reference to the position of the position sensor 315, thereby optically scanning the original document on the original document table glass 3.

The motor 314 is constituted of a stepping motor. The motor 314 is coupled to the encoder 302, and it can be recognized that, by the output of the encoder 302, the optical stages 159, 151 are shifted by what number of the pulses. That is, the positions of the optical stages 159, 151 can be detected by the encoder pulse from the position sensor 315 and the encoder 302.

Description of Recording Section

As shown in FIG. 2, the sheets stacked and contained in an upper cassette 100 are introduced to a registration roller 106 upon separately fed sheet by sheet by operation of a separation nail and a feeding roller 101. In a lower cassette 102, in substantially the same way, the separation nail and a feeding roller 103 are provided. Sheets are introduced sheet by sheet out of a manual feeding guide 104 via a roller 105 to the registration roller 106. A sheet stacking apparatus 108 of a deck type includes an intermediate plate 108a movable up and down by the motor or the like, and the sheet on the intermediate plate 108a is introduced to a conveyance roller 110 upon separately fed sheet by sheet by operation of the a feeding roller 109 and the separation nail.

Arranged around a photosensitive drum 112 are a developing device 114, a transfer charger 115, and a separation charger 116 to form an image forming section. After a toner image developed on the photosensitive drum 112 is transferred to the sheet, the sheet conveyed by the registration roller 106 is conveyed by a conveyance belt 117 to a fixing device 118 at which images are fixed, and then is conveyed to a flapper 120 via the conveyance roller 119.

In a case that the sheet is delivered, the sheet is introduced to a delivery roller 121 via the flapper 120 and conveyed to the interior of a sorter 122. The sorter 122 includes a non-sorting tray 122a, a sorting bin tray 122b, a non-sorting tray delivery roller 122c, and a sorting bin tray delivery roller 122d, and operates to sort the sheets for each stage by moving up and down the non-sorting tray 122a and the sorting bin tray 122d. A delivery tray may be attached in lieu of the sorter.

In a case of double side copying or multiple copying, the post-fixture sheets are conveyed by the conveyance roller 201 by being branched by the flapper 120, and are delivered to an intermediate tray 200, in a case of the double side copying, via belts 202, 204, a path 206, and a delivery roller 205. In a case of the multiple copying, the sheets are delivered to the intermediate tray 200 by the flapper 203. The intermediate tray 200 includes half moon rollers 209, 210 for feeding sheets, a separation roller pair 211, and conveyance rollers 213, 214, 215 for conveying the sheets to the registration roller 106.

Description of the ADF

The ADF 2 is disposed over the reading section 150 and is provided as openable and closeable with respect to the platen glass 161 of the reading section 150 and the original document table glass 3 (see, FIG. 2). Hereinafter, the ADF 2 is described in detail with reference to the drawings.

In FIG. 1, an original document tray 4 is for stacking the original documents P in the sheet shape. A pair of widthwise limiting plates 49 for liming in a widthwise direction is arranged at the original document tray 4 so as to be slidable in the widthwise direction of the original document. Conveyance stability of the sheets during feeding operation can be ensured by limiting, in the widthwise direction, the original documents P stacked on the original document 4 by the widthwise limiting plate 49.

A feeding roller 5 is arranged over the original document tray 4. The feeding roller 5 rotates in association with rotational drive of the separation roller 8 to feed the original document P. The feeding roller 5 normally takes a position sub to an upper side (solid line position in the drawing) as a home position, thereby not disturbing original document setting work. The feeding roller 5 comes down to the dotted line position when the feeding operation begins to contact with an upper surface of the original document P. Because the feeding roller 5 is axially supported by an arm, not shown, the feeding roller 5 is moved up and down upon shifting the arm. A separation pad 6 is disposed on a side facing to the separation roller 8, and applies pressure to the side of the separation roller 8. The separation pad 6 is formed of a rubber material having a slightly lower friction than that of the separation roller 8, and the original documents P fed by the feeding roller 5 are handled one by one to be fed with the separation roller 8.

The registration roller 12 and the registration driven roller 11 are registering means for aligning the front ends of the original documents fed by the separation section. The front ends are aligned upon production of a loop at the original documents where the front ends of the separated original documents are hit to the nipping portion of the stopped registration roller pair 11, 12.

The sheet is conveyed subsequently toward a platen glass 161 by a reading roller 22 and a reading driven roller 14 serving as a conveying device. The original document conveyed to the platen glass 161 is picked up by a jump stage 162, thereby being conveyed with a reading delivery roller 23 and a reading delivery driven roller When image reading finishes, the original document is delivered to a delivery tray 10 by the delivery roller 18. During the double side reading mode, the sheets are not delivered with the delivery roller 18 but switched back to be guided through an upper paper path and then conveyed toward the registration roller pair 11, 12 again. When reaching the registration roller pair 11, 12, the original document is subject to reading on a back side of the original document in substantially the same manner as the above operation.

Description of Drive System

In reference to FIG. 1 through FIG. 4, a drive system for driving the respective rollers is described. A separation motor 50 is a stepping motor and performs separation and conveyance of the original document according to the normal and reverse rotations. Where the separation motor 50 rotates in a feeding direction, the feeding roller 5 comes down from the upper side as the home position (the position indicated with the dotted line in the drawing) to come in pressed contact with the topmost sheet of the original documents on the original document tray 4, and the feeding roller 5 and the separation roller 8 are driven. When the separation roller 50 rotates in the conveyance direction as the opposite direction to the feeding direction, the feeding roller 5 is lifted up to the upper side (the position indicated with the dotted line in the drawing) serving as the home position and maintained at there, and the registration roller 12 is driven.

A reading motor 51 is a stepping motor for driving the reading roller 22, the platen roller 24, the reading delivery roller 23, and the delivery roller 18. The respective rollers are driven at a speed reading images on the conveyed original documents. An isolation solenoid 57 renders separated and contacted with pressure the drive rollers of the delivery roller 18 during the switch-back operation of the double side original document.

Description of Sensors

Referring to FIG. 1 to FIG. 4, the respective sensors are described. A set sensor 40 as a transmission type optical sensor for detecting whether the original document P is set at the original document tray 4 is provided. A tray width sensor 44 is provided below the original document tray 4 for detecting the length in the width direction of the original document P set on the original document tray 4 by detecting the position of the widthwise limiting plate 49.

A registration sensor 7 serving as a transmission type optical sensor for detecting the original document is provided between the separation roller 8 and the registration roller 12, and the front ends of the original documents separately fed are detected, thereby detecting the timing or the like for controlling the hitting amount (or looping amount) to the registration roller 12. A reading sensor 13 serving as a reflecting type optical sensor detecting the original document is placed immediately after the reading roller 22 to produce a reference signal of the beginning timing for image reading at the main reading position 160. A delivery sensor 17 serving as a transmission type for detecting the original document is provided immediately before the delivery roller 18 to detect the delivery timing of the original documents.

When the original document P placed on the original document tray 4 is detected by the set sensor 40 during the feeding operation, the feeding roller 5 comes down and in contact with the top of the original document bundle. Where a starting key is pushed upon entry of copying conditions with the control portion of the photocopier, the size of the original documents is detected by the tray width sensor 44 on the original document tray 4. Holding of the isolation solenoid 57 is then released to render the original documents enter into the downstream portion upon giving the original documents the feeding force from the feeding roller 5.

Subsequently, the original documents P introduced from the original document tray 4 are separated one by one and conveyed to the downstream portion. The original document P passing through the separation portion is conveyed upon which the front end is aligned in a line by the registration roller 12. The original document is conveyed toward the platen glass 161 where the front end reaches the reading roller 22, and the images are read at the main reading position 160 as conveyed by the platen roller 24 and the reading delivery roller 23.

When the image reading operation finishes, the original document is stacked on the delivery tray 10 by the delivery roller 18. During the double side reading mode, the original document is switched back without being delivered by the delivery roller 18 and is guide to an upper paper path to be conveyed toward the registration roller pair 11, 12. When reaching the registration roller pair 11, 12, the original document is read on the back side in substantially the same manner as the above operation.

Description of Control Circuit Blocks

FIG. 5 is a block diagram showing a circuit structure of the controlling apparatus of the ADF in this embodiment. The control circuit is constituted as a microprocessor (CPU 54) is a core member, and input and output ports of the CPU 54 are coupled to respective drive circuits and supplied with sensor signals. The control circuit includes a RAM with a backup battery, not shown, a ROM storing a control sequential software, and a communication IC 55 for controlling data communications with the photocopier body.

The separation motor 50 and the reading motor 51 are driven by the respective stepping motor drivers. Each motor drive receives a phase exciting signal and a motor current control signal from the CPU 54. The isolation solenoid 57 is driven by the driver, and the operation thereof is controlled by a signal supplied to the input and output ports of the CPU 54. The respective sensors such as the registration sensor 7, the set sensor 40, the reading sensor 13, the delivery sensor 17, the tray width sensor 44 are coupled to the input ports of the CPU 54, and are used for monitoring behaviors of the original documents and movable loads in the apparatus.

Description of Reading Section

Referring to FIG. 6 and FIG. 7, a structure near the main reading position 160 of the reading section 150 and its operation is described. The platen glass 161 shown in FIG. 6 is formed with an EC coating (transparent conducting coating) on the glass surface. As shown in FIG. 7, an aluminum sheet 26 in a form of a conductive double side tape is attached at an edge on the upper side of the platen glass 161 from the front side to the back side. A resin sheet 27 is adhered to the aluminum sheet 26, thereby protecting the aluminum sheet 26.

A white platen roller 24 is provided serving as a sheet guide member for forming a small gap with the platen glass 161 on a side of the platen glass 161 opposite to the first optical stage 159. The platen roller 24 rotates in a conveyance direction by drive of the reading motor 51 (see, FIG. 5). The gap between the platen roller 24 and the platen glass 161 is guaranteed to have 0.15 mm by a glass hitting means, not shown.

As shown in FIG. 7, a sheet limiting roller 25 is disposed on an upstream side in the conveyance direction of the platen roller 24. The gap between the sheet limiting roller 25 and the platen glass 161 is guaranteed to have 0.8 mm, and the roller 25 is driven in contact with the conveyed sheet.

A white film 28 serving as a white guide member made of a polyester film is disposed on a downstream side of the sheet limiting roller 25 in the conveyance direction and on an upstream side of the platen roller 24 in the conveyance direction. The white film 28 associates with the platen roller 24 and the sheet limiting roller 25 and is mounted to a guide member, not shown, provided pivotally around the reading roller 22 (see, FIG. 6) as a pivotal center, thereby settling the white degree near the platen roller 24.

When the images on the original document P are read out, the original document P is conveyed at a constant rate on the platen glass 161 as limited with the platen roller 24, the platen glass 161, the sheet limiting roller 25, and the jumping stage 162. At that time, as shown in FIG. 7, there are a position A at which the original document P comes in contact with the platen glass 161 immediately below or around the platen roller 24 and a position B at which the original document P does not come in contact with the platen glass 161 below the white film 28.

Because the first optical stage 159 as the reading device at that time is provided as movable with the motor 314, the reading operation can be performed in properly selecting the main reading position 160 facing to the position A and the sub reading section 163 facing to the position B according to a scanner controller 304.

At that time, since the white platen roller 24 is located above the main reading position 160 and since the white film 28 is located above the sub reading position 163, images can be read with the same quality as of the main reading position 160 even where the first optical stage 150 moves to the sub reading position 163 at a region out of the platen roller 24.

Accordingly, the reading operation is normally made at the main reading position 160 at which the original document P comes in contact with the platen glass 161, thereby preventing stripe images from occurring where floating dusts such as toner powders, paper powders, and rubber debris generated during the original document conveyance operation are made scattered and stacked on the platen glass 161. Furthermore, where adhering dusts such as inks, correction liquids, pastes clinging to the original document P are frictionally contacted to the platen glass 161 and adhered to the main reading position 160, the reading position is switched to an sub reading position 163 at which the original document P does not contact to the platen glass 161, thereby preventing adhering dusts from being read as stripe images.

In comparison between the main reading position 160 and the sub reading position 163, the reading operation can be made with the quality of nearly the same degree, but the main reading position 160 indicates that the position is easier for adjusting the focus because the distance from the first optical stage 159 is constant and is advantageous because of not easily affected from impacts during the original document conveyance operation. In a meanwhile, occurrences of stripe images are not so frequent, and such stripe images may not occur at the sub reading position even where the stripe images occur at the main reading position 160. Consequently, it is desirable that images are read normally at the main reading position 160 and are read at the sub reading position 163 in case that the stripe images occur at the main reading position 160.

Switching of the reading positions can be set according to intention of the user. Moreover, it can be set automatically according to judgment of the control system, not shown, of the image reading apparatus. For instance, it is possible to judge it based on the total of the number of sheets of the read seat and the passing time. Switching also can be made when the control system recognized any stripe image during image recognition processing. For users frequently using original documents written by pencils in which floating dusts tend to occur easily or original documents having an inferior settling nature, the first optical stage 159 may be stationally set to the main reading position 160; for users frequently using original documents to which correction liquids and pastes are adhered as easily generating adhering dusts, the stage is secured to the sub reading position 163, thereby setting the optimum reading position in matching the use condition of the users.

Second Embodiment

Figure 8:
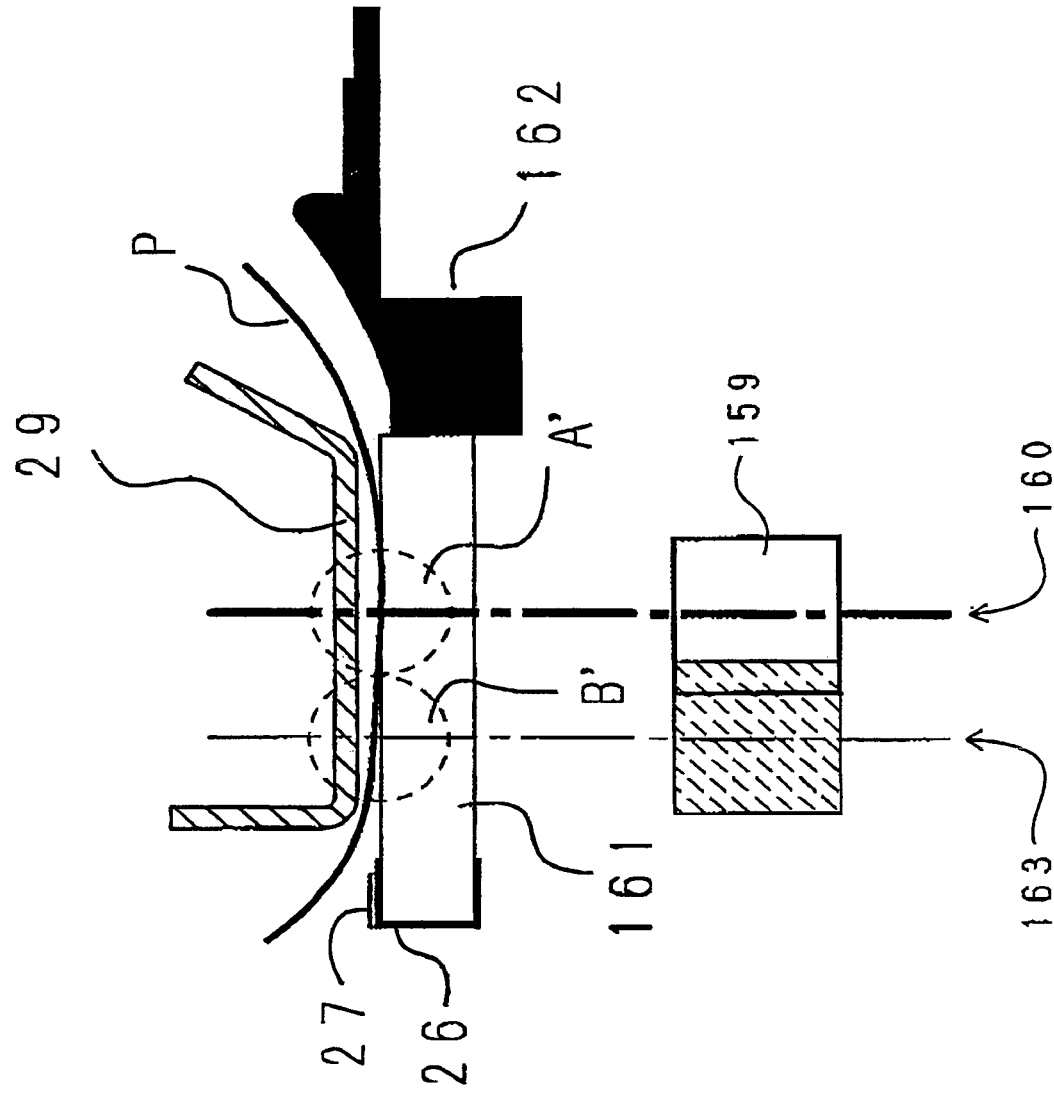
FIG. 8 is a structural diagram showing the essential portion of the image reading apparatus according to this embodiment.

The second embodiment of the image reading apparatus according to the invention is described FIG. 8 is an essential structural diagram of the image reading apparatus according to this embodiment; descriptions for portions otherwise having the same descriptions in the above first embodiment are omitted upon providing the same reference numbers.

In this embodiment, the image reading apparatus does not have the platen roller, the sheet limiting roller, the white film, but instead having a white platen guide 29 as a sheet guide member. The gap between the platen guide 29 and the platen glass 161 is guaranteed to have 1 mm by the glass hitting means, not shown.

The original document P is conveyed at a constant rate on the platen glass 161 as limited with the platen guide 29, the platen glass 161, and the jumping stage 162. At that time, there are a position A' at which the original document P comes in contact with the platen glass 161 immediately below or around the platen guide 29 and, on the upstream side of the position A', a position B' at which the original document P does not come in contact with the platen glass 161 below the platen guide 29.

Because the first optical stage 159 as the reading device at that time is provided as movable with the motor 314, the reading operation can be performed in properly selecting the main reading position 160 facing to the position A' and the sub reading section 163 facing to the position B' according to the scanner controller 304. In other words, the platen guide 29 is provided with a width allowing reading at both of positions A', B'.

Thus, substantially the same advantages can be obtained even where using the white platen guide 29 in lieu of the platen roller and the white film, so that the apparatus structure can be made simpler and produced with reduced costs.

Third Embodiment

Figure 9:
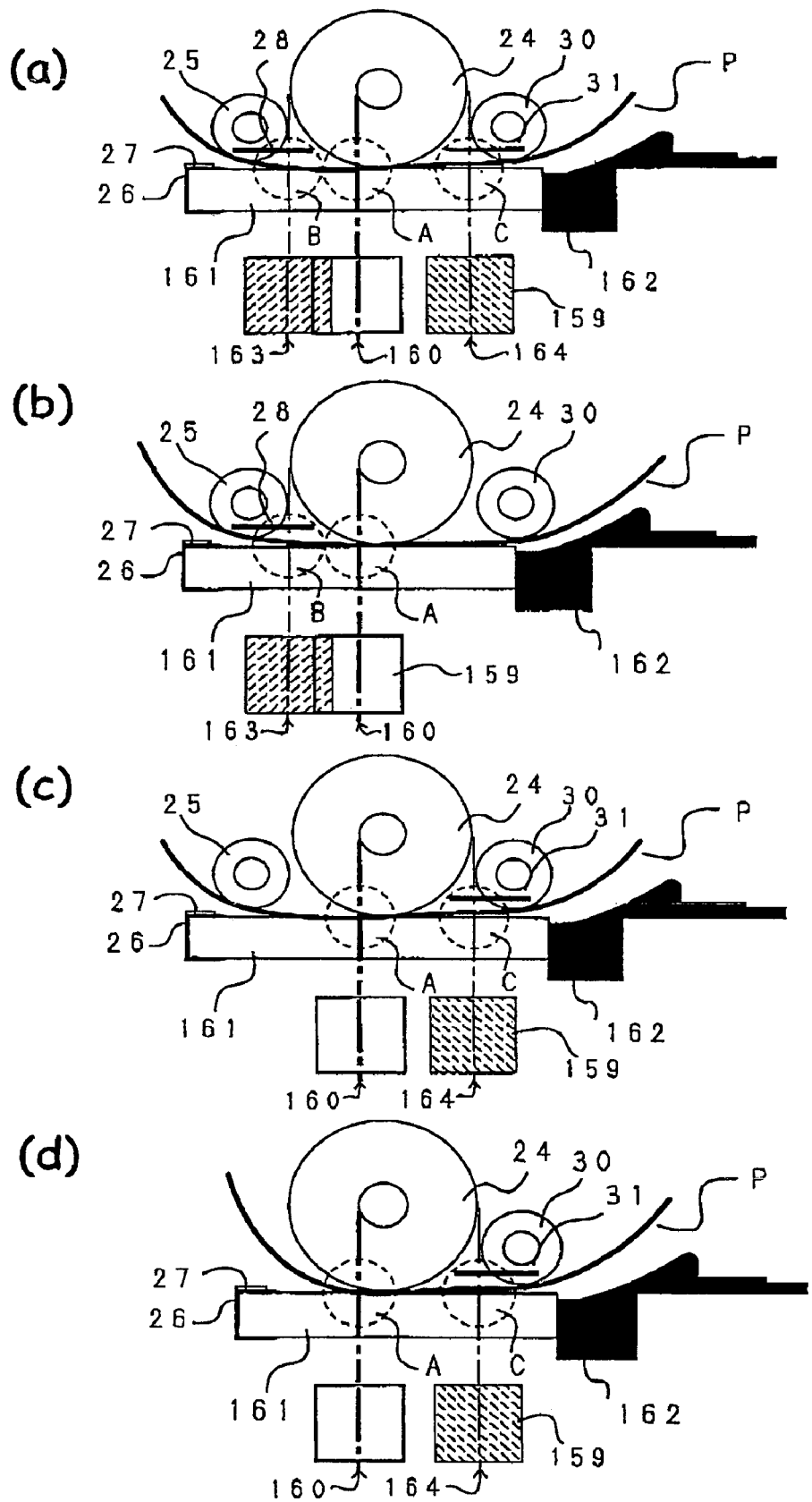
FIG. 9 is a diagram showing the structure and operation of the image reading apparatus according to the embodiment.
Figure 10:
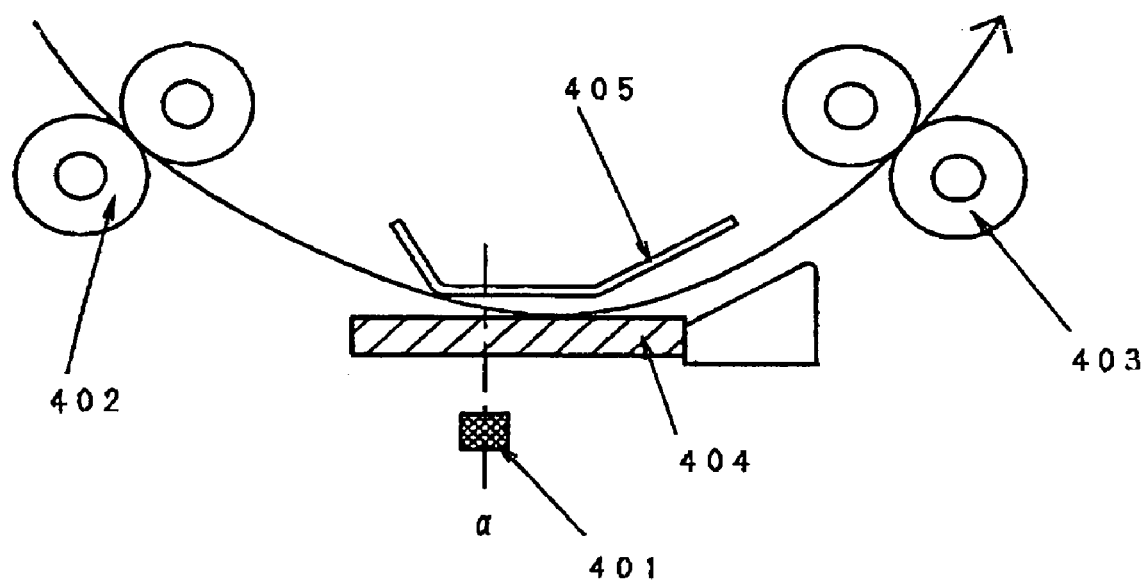
FIG. 10 is a diagram showing a structure near the reading position in a conventional image reading apparatus.
Figure 11:
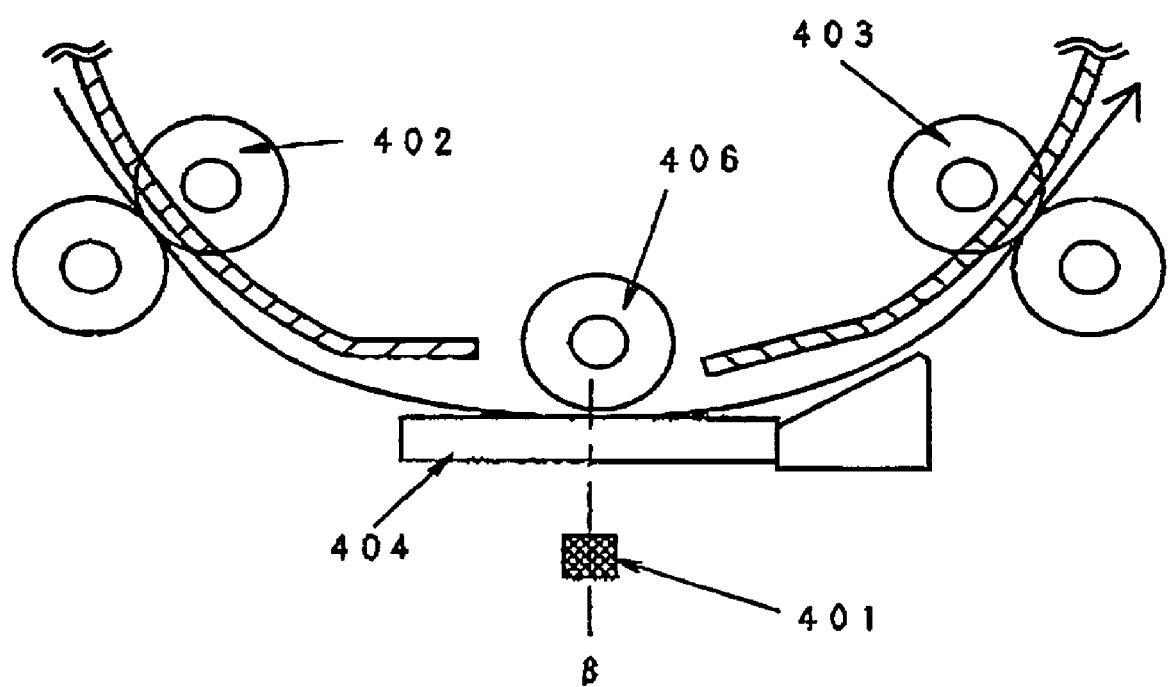
FIG. 11 is a diagram showing a structure near the reading position in a conventional image reading apparatus.

The third embodiment of the image reading apparatus according to the invention is described. FIG. 9 is a diagram illustrating structure and operation of the image reading apparatus according to this embodiment; descriptions for portions otherwise having the same descriptions in the above embodiments are omitted upon providing the same reference numbers.

As shown in FIG. 9(*a*), although in the first embodiment description is made with the white film 28 as the white guide member only on the upstream side of the platen roller 24, the white guide member is also provided on the downstream side of the platen roller 24.

The sheet limiting roller 25 is disposed on an upstream side in the conveyance direction of the platen roller 24. The white film 28 serving as a white guide member is disposed on a downstream side of the sheet limiting roller 25 in the conveyance direction and on an upstream side of the platen roller 24 in the conveyance direction. Similarly, another white film 31 serving as a white guide member is disposed on an upstream side of the sheet limiting roller 30 in the conveyance direction and on a downstream side of the platen roller 24 in the conveyance direction. The platen roller 24, the sheet limiting rollers 25, 30, and the white films 28, 31 are mounted to a guide member, not shown, formed pivotally around the reading roller 22 (see, FIG. 6) as a pivotal center, thereby settling the white degree near the platen roller 24.

When images are read out of the original document P, the original document P is conveyed at a constant rate on the platen glass 161 as limited with the platen roller 24, the platen glass 161, the sheet limiting rollers 25, 30 and the jumping stage 162. At that time, there are a position A at which the original document P comes in contact with the platen glass 161 immediately below or around the platen roller 24 and positions B, C at which the original document P does not come in contact with the platen glass 161 below the white films 28, 31.

Because the first optical stage 159 at that time is provided as movable with the motor 314, the reading operation can be performed according to the scanner controller 304 in properly selecting the main reading position 160 facing to the position A, the sub reading section 163 facing to the position B, the sub reading section 164 facing to the position C.

By providing the white films 28, 31 as described above, images can be read with the same quality as that of the main reading position 160 even where the first optical stage 159 moves to any of the sub reading positions 163, 164 as out of the region of the platen roller 24. Therefore, the reading positions can be chosen more flexibly, thereby preventing adhering dusts from being read out as stripe images.

It is to be noted that as shown in FIG. 9(*b*), where the sheet limiting roller 30 exists but no white film 31 exists, the reading operation can be made by switching the main reading position 160 and the sub reading position 163 in substantially the same way as m the first embodiment.

As shown in FIG. 9(*c*), if the apparatus does not have the white film 28, the reading operation can be made by switching the main reading position 160 and the sub reading position 164. As shown in FIG. 9(*d*), if the apparatus does not have the sheet limiting roller 25 and the white film 28 but have the sheet limiting roller 30 and the white film 81, the reading operation can be made by switching the main reading position 160 and the sub reading position 164.

As described above, by providing the white guide member on the downstream side of the platen roller 24 in the conveyance direction, a wide selection of the reading positions can be made, and occurrences of stripe images can be avoided.

What is claimed is:

1. An image reading apparatus comprising:
   a conveying device which conveys a sheet to a reading position;
   a platen glass which guides the sheet conveyed at the reading position;
   a reading device which reads through the platen glass an image on the sheet conveyed at the reading position;
   a sheet guide member, disposed on a side opposite to the reading device with respect to the platen glass, which forms a small gap with the platen glass; and
   a driving device which moves the reading device,
   wherein the driving device moves the reading device to a main reading position for a reading operation at a position at which the sheet conveyed to the reading position is in contact with the platen glass and to at least one sub reading position for a reading operation at a position at which the sheet conveyed to the reading position is not in contact with the platen glass.

2. The image reading apparatus according to claim 1, wherein the sheet guide member is a platen roller.

3. The image reading apparatus according to claim 1, further comprising a control system, which controls switching of the reading positions between the main reading position and the sub reading position.

4. The image reading apparatus according to claim 3, wherein the control system switches the reading position when any stripe image is recognized during image recognition processing.

5. An image reading apparatus comprising:
- a conveying device which conveys a sheet to a reading position;
- a platen glass which guiding the sheet conveyed at the reading position;
- a reading device which reading through the platen glass an image on the sheet conveyed at the reading position;
- a platen roller, disposed on a side opposite to the reading device with respect to the platen glass, which forms a small gap with the platen glass;
- at least one sheet restricting roller arranged adjacent to the platen glass for forming a small gap with the platen glass to restrict the sheet toward the platen glass;
- at least one white guide member disposed facing to the platen glass between the sheet restricting roller and the platen roller; and
- a driving device which moves the reading device,
- wherein the driving device moves the reading device to a main reading position for a reading operation at a position adjacent to the platen roller and to at least one sub reading position for a reading operation at a position adjacent to the white guide member, and wherein the main reading position is a position where the sheet conveyed in the reading position contacts with the platen glass, and the sub reading position is a position where the sheet conveyed in the reading position does not contact with the platen glass.

6. The image reading apparatus according to claim 5, wherein the sheet restricting roller is disposed on at least one of an upstream side and a downstream side of the platen roller in the conveyance direction, wherein the white guide member is disposed between the sheet restricting roller and the platen roller.

7. The image reading apparatus according to claim 5, further comprising a control system, which controls switching of the reading positions between the main reading position and the sub reading position.

8. The image reading apparatus according to claim 7, wherein the control system switches the reading position when any stripe image is recognized during image recognition processing.

9. An image forming apparatus comprising:
- the image reading apparatus as set forth in any one of claims 1 through 6, 7 and 8; and
- an image forming section for forming an image on the sheet based on image information read by the image reading apparatus.

* * * * *

UNITED STATES PATENT AND TRADEMARK OFFICE
CERTIFICATE OF CORRECTION

PATENT NO. : 7,317,561 B2
APPLICATION NO. : 10/781886
DATED : January 8, 2008
INVENTOR(S) : Yuichi Makino et al.

It is certified that error appears in the above-identified patent and that said Letters Patent is hereby corrected as shown below:

COLUMN 1:

Line 40, "a is" should be --$\alpha$ is--.

COLUMN 3:

Line 11, "black" should read --block--; and
Line 42, "black" should read --block--.

COLUMN 5:

Line 26, "liming" should read --limiting--.

COLUMN 6:

Line 24, "at" should be deleted.

COLUMN 7:

Line 1, "enter" should read --to enter--;
Line 17, "guide" should read --guided--; and
Line 26, "is a" should read --, a--.

COLUMN 8:

Line 43, "an" should read --a--; and
Line 52, "of" should read --it is--.

COLUMN 9:

Line 14, "described" should read --described.--;
Line 21, "having" should read --has--; and
Line 24, "have" should be --be--.

COLUMN 10:

Line 44, "have" should be --has--; and "Film 81," should read --Film 31,--.

UNITED STATES PATENT AND TRADEMARK OFFICE
CERTIFICATE OF CORRECTION

| | |
|---|---|
| PATENT NO. | : 7,317,561 B2 |
| APPLICATION NO. | : 10/781886 |
| DATED | : January 8, 2008 |
| INVENTOR(S) | : Yuichi Makino et al. |

It is certified that error appears in the above-identified patent and that said Letters Patent is hereby corrected as shown below:

<u>COLUMN 11</u>:

Line 17, "guiding" should read --guides--; and
    Line 19, "reading" should read --reads--.

<u>COLUMN 12</u>:

Line 27, "claims 1 through 6, 7 and 8;" should read --claims 1 through 8;--.

Signed and Sealed this

Twenty-sixth Day of August, 2008

JON W. DUDAS
*Director of the United States Patent and Trademark Office*